United States Patent
Yano

(10) Patent No.: US 9,283,705 B2
(45) Date of Patent: Mar. 15, 2016

(54) INJECTION UNIT FOR AN INJECTION MOLDING MACHINE

(71) Applicant: FANUC Corporation, Yamanashi (JP)

(72) Inventor: Satoshi Yano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/719,366

(22) Filed: May 22, 2015

(65) Prior Publication Data

US 2015/0343685 A1    Dec. 3, 2015

(30) Foreign Application Priority Data

Jun. 3, 2014  (JP) .................................. 2014-114529

(51) Int. Cl.
  *B29C 45/50*   (2006.01)
  *B29C 45/17*   (2006.01)

(52) U.S. Cl.
  CPC ......... *B29C 45/1744* (2013.01); *B29C 45/1747* (2013.01); *B29C 45/50* (2013.01); *B29C 45/5008* (2013.01)

(58) Field of Classification Search
  CPC ............................ B29C 45/5008; B29C 45/50
  USPC .................................................. 425/145, 587
  See application file for complete search history.

(56) References Cited

U.S. PATENT DOCUMENTS

| | | | | |
|---|---|---|---|---|
| 4,828,473 A | * | 5/1989 | Otake ................. | B29C 45/5008 425/145 |
| 5,129,808 A | * | 7/1992 | Watanabe ........... | B29C 45/5008 425/145 |
| 5,997,778 A | * | 12/1999 | Bulgrin ................... | B29C 45/77 425/145 |
| 7,165,966 B2 | * | 1/2007 | Onuma ............... | B29C 45/5008 425/145 |
| 2001/0020753 A1 | * | 9/2001 | Sato ........................ | B29C 45/77 425/145 |
| 2001/0026031 A1 | * | 10/2001 | Onishi .................... | B29C 45/50 425/145 |
| 2002/0081351 A1 | | 6/2002 | Yokoya et al. | |

FOREIGN PATENT DOCUMENTS

| | | |
|---|---|---|
| JP | H10-217297 A | 8/1998 |
| JP | 2000-218663 A | 8/2000 |
| JP | 2001-269974 A | 10/2001 |
| JP | 2002-166443 A | 6/2002 |
| JP | 2002-166444 A | 6/2002 |
| JP | 2009-255372 A | 11/2009 |

OTHER PUBLICATIONS

Notice of Allowance mailed Aug. 25, 2015, corresponding to Japanese Patent Application No. 2014-114529.

* cited by examiner

*Primary Examiner* — Tim Heitbrink
(74) *Attorney, Agent, or Firm* — Hauptman Ham, LLP

(57) ABSTRACT

A pusher plate is divided into two parts, first and second pusher plates, which can be connected to and disconnected from each other by a bolt. The first pusher plate is fitted with an injection screw and supported on a base by a position adjustment mechanism. The second pusher plate is fitted with a drive unit capable of moving the first pusher plate in a longitudinal direction and supported by a tie bar connecting a front plate and a rear plate.

4 Claims, 8 Drawing Sheets

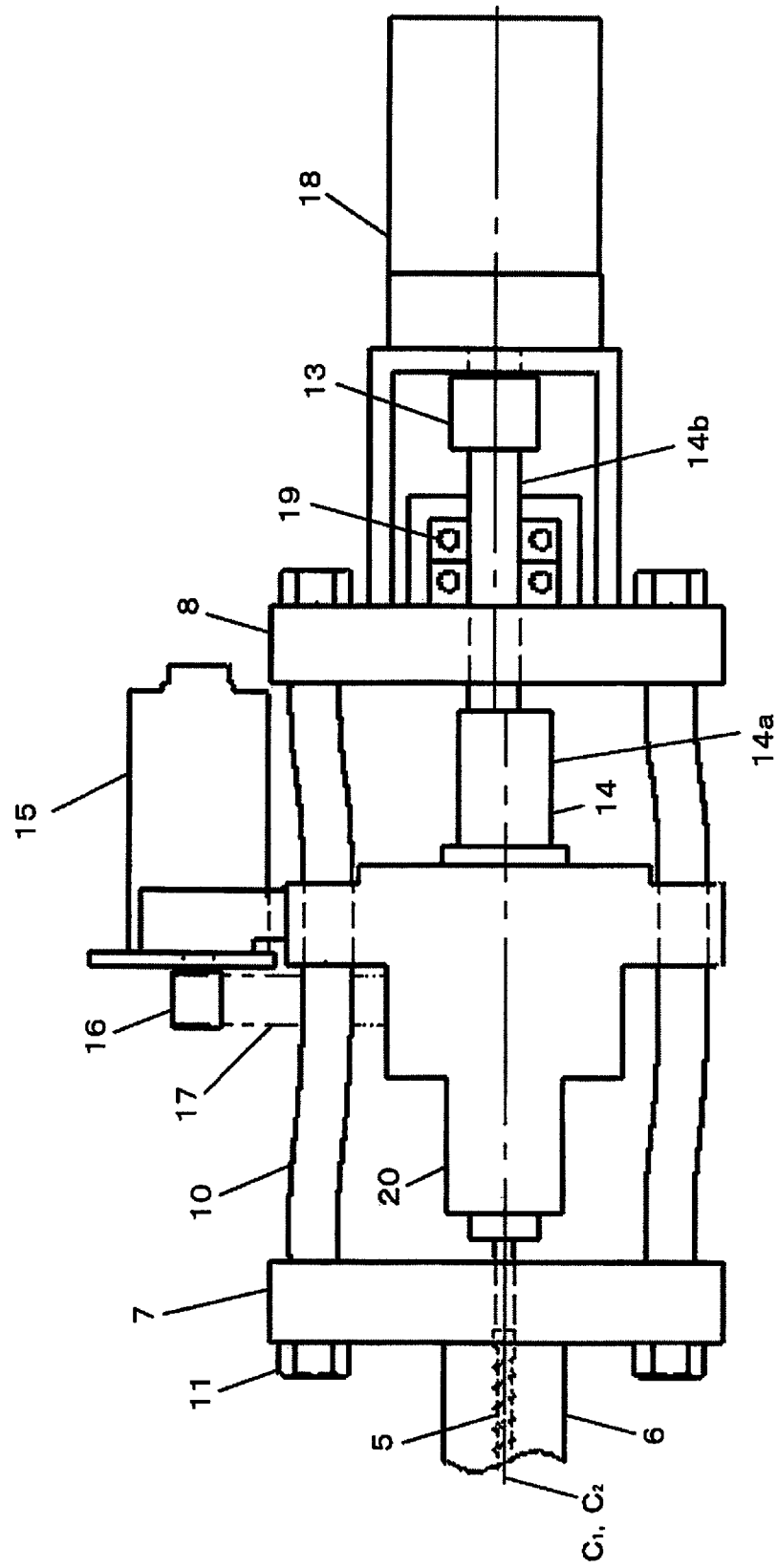

INJECTION UNIT FOR AN INJECTION MOLDING MACHINE

RELATED APPLICATIONS

The present application claims priority to Japanese Application Number 2014-114529, filed Jun. 3, 2014, the disclosure of which is hereby incorporated by reference herein in its entirety.

BACKGROUND OF THE INVENTION

1. Field of the Invention

The present invention relates to an injection unit of an injection molding machine.

2. Description of the Related Art

A prior art injection unit of an injection molding machine comprises a base, heating cylinder, front plate secured to the base, and rear plate connected to the front plate by tie bars. A pusher plate fitted with an injection screw, which is rotatable and axially immovable, is disposed between the front and rear plates. A drive mechanism for advancing and retracting the pusher plate is disposed between the pusher plate and the rear plate. With this configuration, the pusher plate advances and retreats, guided by the tie bars, to move the injection screw forward and backward.

Normally, in the injection unit of an injection molding machine constructed in this manner, the posture of the pusher plate should be adjusted to align the axes of the heating cylinder attached to the front plate with the injection screw attached to the pusher plate. Techniques for adjusting the posture of the pusher plate of this type are known from the following patent documents.

Japanese Patent Application Laid-Open No. 10-217297 discloses a technique in which a clearance is formed between a connecting bolt and a pressure plate to prevent contact between the two so that the accuracy of pressure detection by a load cell cannot be damaged.

In the technique described above, however, the position of the pusher plate cannot be adjusted despite the presence of the clearance between the connecting bolt and the pressure plate.

Japanese Patent Application Laid-Open No. 2002-166443 discloses a technique for an electric injection mechanism, in which alignment members are disposed on the opposite sides of a lower part of a screw drive body to align an injection heating cylinder with the screw drive body. The alignment members are each provided with height adjusting means and serve to slidably support the screw drive body in conjunction with an installation member. Further, Japanese Patent Application Laid-Open No. 2001-269974 discloses a technique for an injection unit of an injection molding machine, in which a linear guide with height adjustability is provided at a lower part of a moving plate to prevent downward misalignment of the moving plate.

In the techniques described above, the pusher plate is supported by the installation member or the moving plate. Even though only the pusher plate is adjusted, misalignment between the axes of the heating cylinder and the screw may occur depending on variation in the accuracy of each component, or an unbalanced load applied to a ball screw portion may occur. In contrast with this, although the position of the pusher plate can be adjusted so that the axis of the screw is aligned with that of the heating cylinder attached to the front plate, the tie bars may be deflected or a ball screw nut connected to the pusher plate and a ball screw shaft connected to the rear plate may be misaligned. Consequently, an unbalanced load may be applied to the ball screw, thereby reducing its service life.

Japanese Patent Application Laid-Open No. 2000-218663 discloses a technique in which a screw holding member and a pusher plate are connected by means of bolts to each other through a load cell, the screw holding member is supported by tie rods, and the pusher plate is supported by the tie rods and guide rods.

In the technique described above, however, both the screw holding member and the pusher plate are supported by the tie rods. Therefore, both the loads of the screw holding member and the pusher plate are inevitably applied to the tie rods, so that the tie rods may be deflected. As a result, there may be caused misalignment between the heating cylinder and the screw, increase in the sliding resistance of the pusher plate, or reduction in the service life of a drive mechanism, such as a ball screw for driving the pusher plate, due to an unbalanced load.

SUMMARY OF THE INVENTION

Accordingly, an object of the present invention is to provide an injection unit of an injection molding machine, capable of easily aligning the axes of a heating cylinder and a pusher plate without failing to maintain the service life of a constituent member of an injection molding machine by reducing an unbalanced load on the constituent member.

The injection unit of an injection molding machine according to the present invention moves an injection screw in a longitudinal direction, and includes: a first member which is disposed to be movable in the longitudinal direction and to which the injection screw is attached; a second member capable of being connected to the first member at the back thereof by a connection member; and drive means attached to the second member and capable of causing the second member to move the first member in the longitudinal direction. The connection between the first and second members by the connection member is removable, and the first and second members are supported by different support members when the connection between the first and second members by the connection member is removed.

The support member supporting the first member may be provided with a position adjustment mechanism.

The different support members supporting the first and second members may each be provided with a position adjustment mechanism.

According to the present invention, there can be provided an injection unit of an injection molding machine, capable of easily aligning the axes of a heating cylinder and a pusher plate without failing to maintain the service life of a constituent member of an injection molding machine by reducing an unbalanced load on the constituent member.

BRIEF DESCRIPTION OF THE DRAWINGS

The above and other objects and features of the present invention will be obvious from the ensuing description of embodiments with reference to the accompanying drawings, in which:

FIG. 8 is a schematic side view of a prior art injection unit of an injection molding machine.

DETAILED DESCRIPTION OF THE PREFERRED EMBODIMENTS

Before describing embodiments of an injection unit of an injection molding machine according to the present invention, methods for adjusting the axes of a screw and a heating cylinder in prior art injection units of an injection molding machine will first be described with reference to FIGS. 7 and 8.

Figure 7:
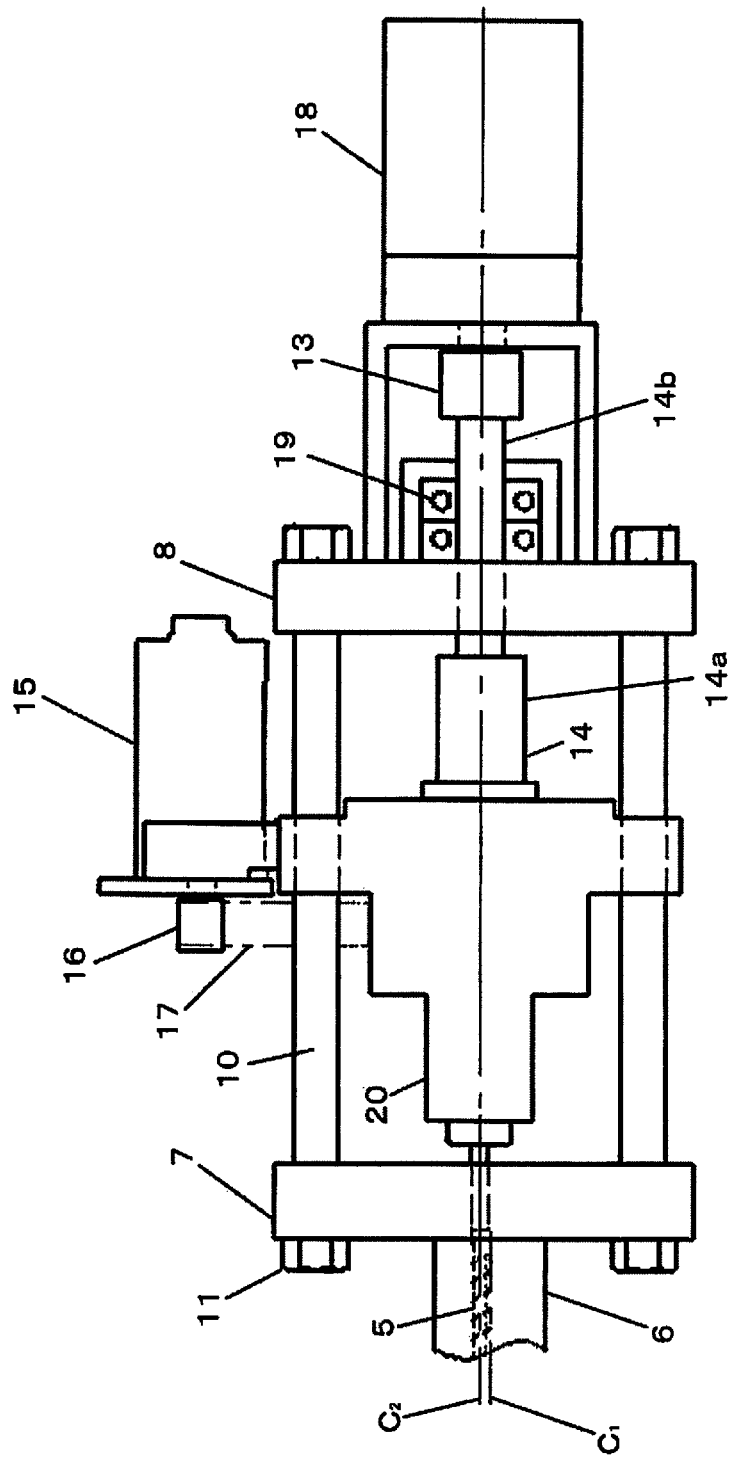
FIG. 7 is a schematic side view of a prior art injection unit of an injection molding machine.

In the injection unit shown in FIG. 7, a front plate 7 and a rear plate 8 are connected by tie bars 10. Each of the tie bars 10 are secured on either side by a tie bar nut 11.

A pusher plate 20 is disposed between the front and rear plates 7 and 8. The pusher plate 20 is formed with holes (not shown) for the tie bars and can advance and retreat, guided by the tie bars 10, with the aid of bushes secured to the holes.

Further, the pusher plate 20 is provided with a screw 5 and a ball screw 14. The screw 5 is rotatably supported on the pusher plate 20 by a bearing (not shown). The ball screw 14 is disposed between the pusher plate 20 and the rear plate 8 and secured to the pusher plate 20 by a ball screw nut 14a. A ball screw shaft 14b is connected to the rear plate 8 through a bearing 19.

A screw advancing and retracting motor 18 is connected to the ball screw 14 by a rotation transmitting member 13. Further, a screw rotating motor 15 is configured to rotate the screw 5 by means of a driven pulley and a screw connection member, as well as a driving pulley 16 mounted on its shaft and a timing belt 17 passed around the driving pulley 16, as the shaft rotates.

The rotation of the screw rotating motor 15 is transmitted to the screw 5 by the driving pulley 16, timing belt 17, driven pulley, and screw connection member. The rotation of the screw advancing and retracting motor 18 is converted into an advancing or retreating motion of the pusher plate 20 by the ball screw 14.

The following is a description of alignment (axis adjustment) between the axes of the heating cylinder attached to the front plate and the injection screw attached to the pusher plate, in the prior art injection unit of FIG. 7 constructed in this manner.

In the injection unit shown in FIG. 7, an axis C1 of a heating cylinder 6 and an axis C2 of the screw 5 are not aligned with each other. In order to align the axes C1 and C2 in this state, the position of the pusher plate 20 has to be adjusted.

In an injection unit shown in FIG. 8, the position of the pusher plate 20 is adjusted to align the axis C2 of the screw 5 with the axis C1 of the heating cylinder 6. Since the pusher plate 20 is moved to align the axes C1 and C2 of the heating cylinder 6 and the screw 5, however, the tie bars 10 may be deflected or the ball screw nut 14a and the ball screw shaft 14b may be misaligned, in some cases, as shown in FIG. 8.

The present invention is intended to solve the above-described problems of the prior art. Some embodiments of the invention will now be described with reference to FIGS. 1 to 5. Like reference numerals are used to denote the same constituent elements as their conventional counterparts shown in FIGS. 7 and 8, and a detailed description thereof will be omitted.

Figure 2:
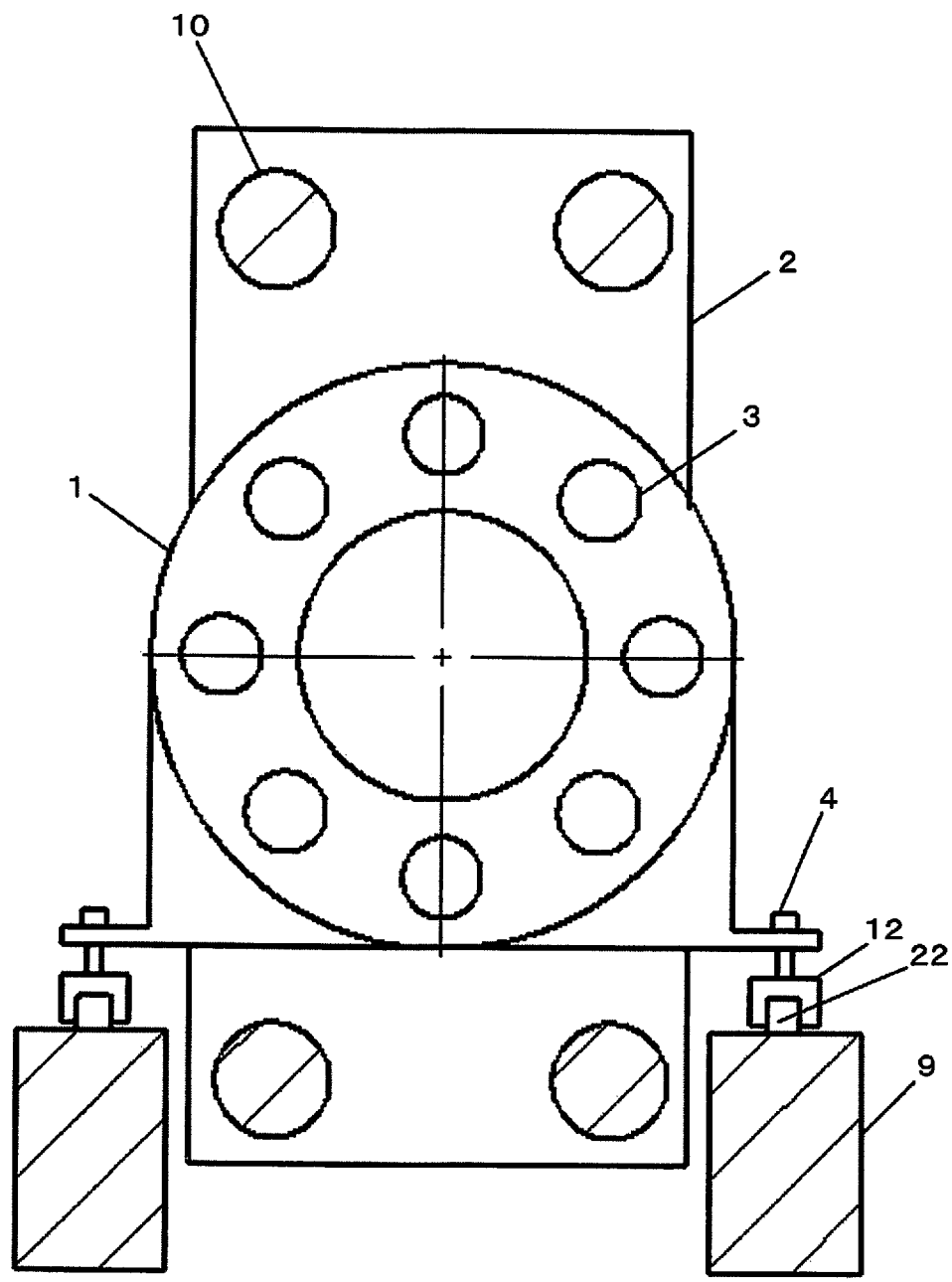
FIG. 2 is a view of the injection unit of FIG. 1 taken from the front side of a first pusher plate.
Figure 3:
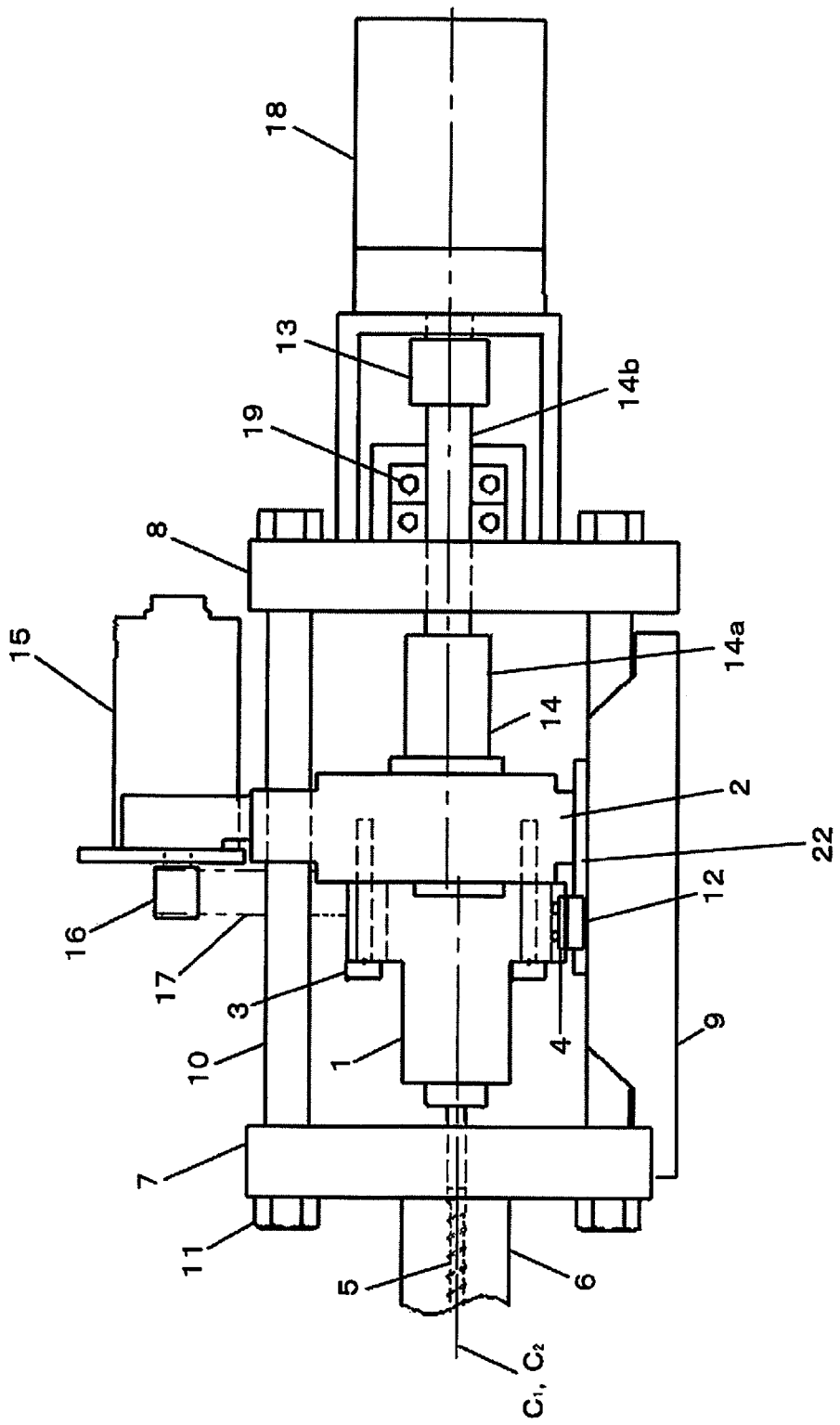
FIG. 3 is a view illustrating a method for adjusting the axis of a screw in the injection unit of FIG. 1.

A first embodiment of the injection unit of an injection molding machine according to the present invention will first be described with reference to FIGS. 1 to 3.

First and second pusher plates 1 and 2 are provided between front and rear plates 7 and 8. Thus, the present embodiment differs from the prior art techniques mainly in that the pusher plate is divided into two parts, the first and second pusher plates 1 and 2.

A ball screw 14 is disposed between the second pusher plate 2 and the rear plate 8. A ball screw nut 14a of the ball screw 14 is secured to the second pusher plate 2, and a ball screw shaft 14b is connected to the rear plate 8 by a bearing 19. While the first and second pusher plates 1 and 2 are secured to each other by connecting bolts 3, slight gaps are provided individually between through-holes (not shown) in the first pusher plate 1 and the connecting bolts 3 that penetrate the through-holes. Consequently, the position of connection between the first and second pusher plates 1 and 2 can be adjusted.

A guide rail 22 is secured on a base 9 and a linear guide 12 is slidably provided on the guide rail 22. The first pusher plate 1 is disposed with the aid of a position adjustment mechanism 4 on its linear guide 12. The first pusher plate 1 advances and retreats as the linear guide 12 is moved forward and backward along the guide rail 22. The position adjustment mechanism 4 includes a bolt capable of lifting the first pusher plate 1 and a shim inserted into a gap between the linear guide 12 and the first pusher plate 1 lifted by the bolt. The height of the first pusher plate 1 is adjusted by lifting the first pusher plate 1 by means of the bolt and inserting the shim of a certain thickness into the gap between the plate 1 and the guide 12. The position adjustment mechanism 4 may be of another configuration.

The second pusher plate 2 is formed with holes (not shown) for tie bars and can advance and retreat, guided by tie bars 10, with the aid of bushes secured to the holes. On the other hand, the first pusher plate 1 is provided with a bearing (not shown) and a screw 5 is rotatably supported on the first pusher plate 1 by the bearing.

Figure 1:
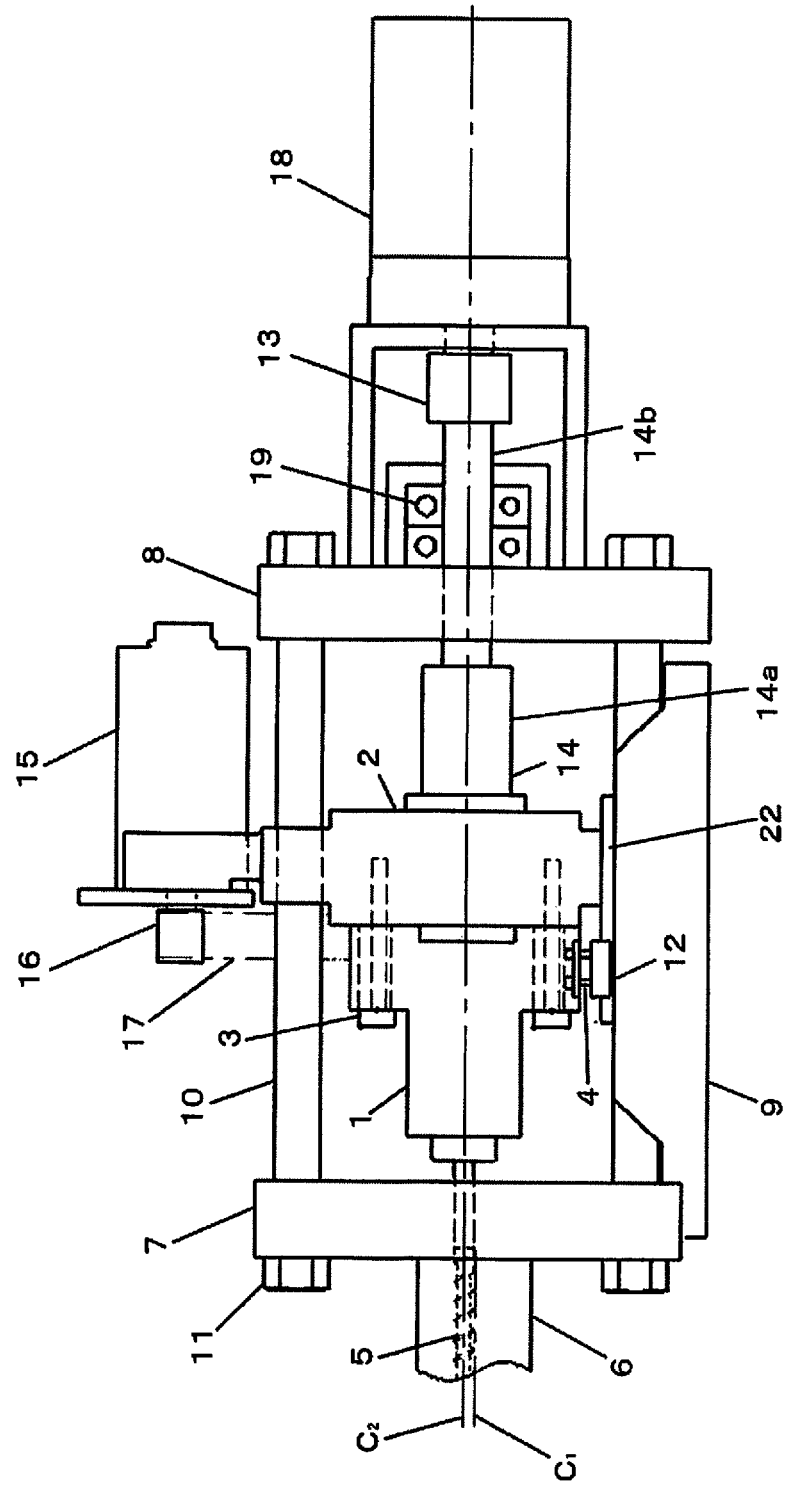
FIG. 1 is a side view illustrating a first embodiment of an injection unit of an injection molding machine according to the present invention.

The following is a description of the operation of the injection unit shown in FIG. 1.

The rotation of a screw rotating motor 15 is transmitted to the screw 5 through a driving pulley 16, timing belt 17, driven pulley (not shown), and screw connection member (not shown). On the other hand, the rotation of a screw advancing and retracting motor 18 is converted into the advancing or retreating motion of the second pusher plate 2 by the ball screw 14. In the injection unit of FIG. 1, the ball screw 14 and the screw advancing and retracting motor 18 are connected directly by a rotation transmitting member 13. Alternatively, however, the injection unit may be configured so that the rotation of the screw advancing and retracting motor 18 is decelerated by means of pulleys and a belt as it is transmitted to the ball screw 14.

The first pusher plate 1 is connected to the second pusher plate 2, and the screw 5 is connected to the first pusher plate 1. Therefore, the screw 5 advances and retreats as the screw advancing and retracting motor 18 rotates. As the screw 5 rotates and moves forward and backward in the heating cylinder 6, a resin is melted, mixed, and injected. In order to properly melt, mix, and inject the resin, it is necessary to align the axes C1 and C2 of the heating cylinder 6 and the screw 5 (axis adjustment).

A method for aligning the axes C1 and C2 of the heating cylinder 6 and the screw 5 in the injection unit will be described with reference to FIG. 3.

The connecting bolts 3 that connect the first and second pusher plates 1 and 2 are loosened to disconnect the pusher plates 1 and 2 from each other. Since there are the slight gaps between the through-holes (not shown) in the first pusher plate 1 and the connecting bolts 3 that penetrate the through-holes, the first pusher plate 1 can be moved to be adjusted in position by a margin for the gaps by using the position adjustment mechanism 4. Since the second pusher plate 2 is supported by the tie bars 10, on the other hand, its position is maintained as it is by the tie bars 10 while the position of the first pusher plate 1 is being adjusted.

In the prior art, as shown in FIG. 7, the total weight of the pusher plate 20 is applied to the tie bars 10. In the present embodiment, however, the pusher plate is divided into the first and second pusher plates 1 and 2 in such a manner that the first pusher plate 1 is supported by the linear guide 12 and the position adjustment mechanism 4 and that the second pusher plate 2 is supported by the tie bars 10. Since only the weight of the second pusher plate 2 is applied to the tie bars 10, therefore, the deflection of the tie bars 10 is slight and the ball screw 14 is affected little by an unbalanced load, so that the service life of the ball screw 14 can be prevented from being reduced.

In present embodiment, the second pusher plate 2 may be further provided with a position adjustment mechanism, which serves to prevent the slight deflection of the tie bars 10 and highly accurately adjust misalignment between the axes of the ball screw nut 14a and the ball screw shaft 14b. As this position adjustment mechanism, a shim may be provided between the second pusher plate 2 and the tie bars 10. Further, gaps may be previously provided between the front plate 7 and/or the rear plate 8 and the tie bars 10 so that the positions of the tie bars 10 can be adjusted when the tie bars are secured to the front plate 7 and/or the rear plate 8. In this way, the position of the second pusher plate 2, which advances and retreats, guided by the tie bars 10, can be adjusted.

Figure 4:
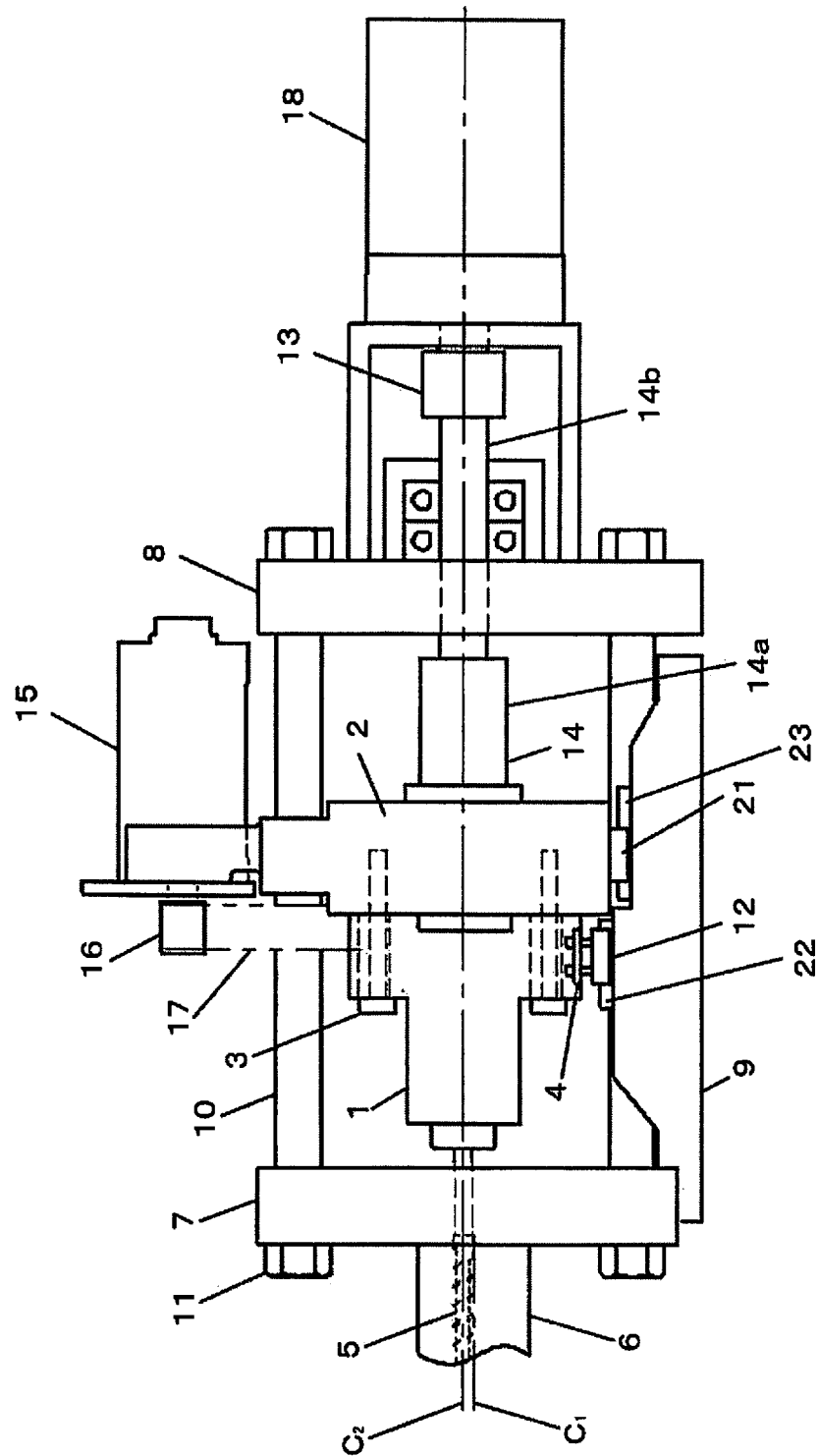
FIG. 4 is a side view illustrating a second embodiment of the injection unit of an injection molding machine according to the present invention.
Figure 5:
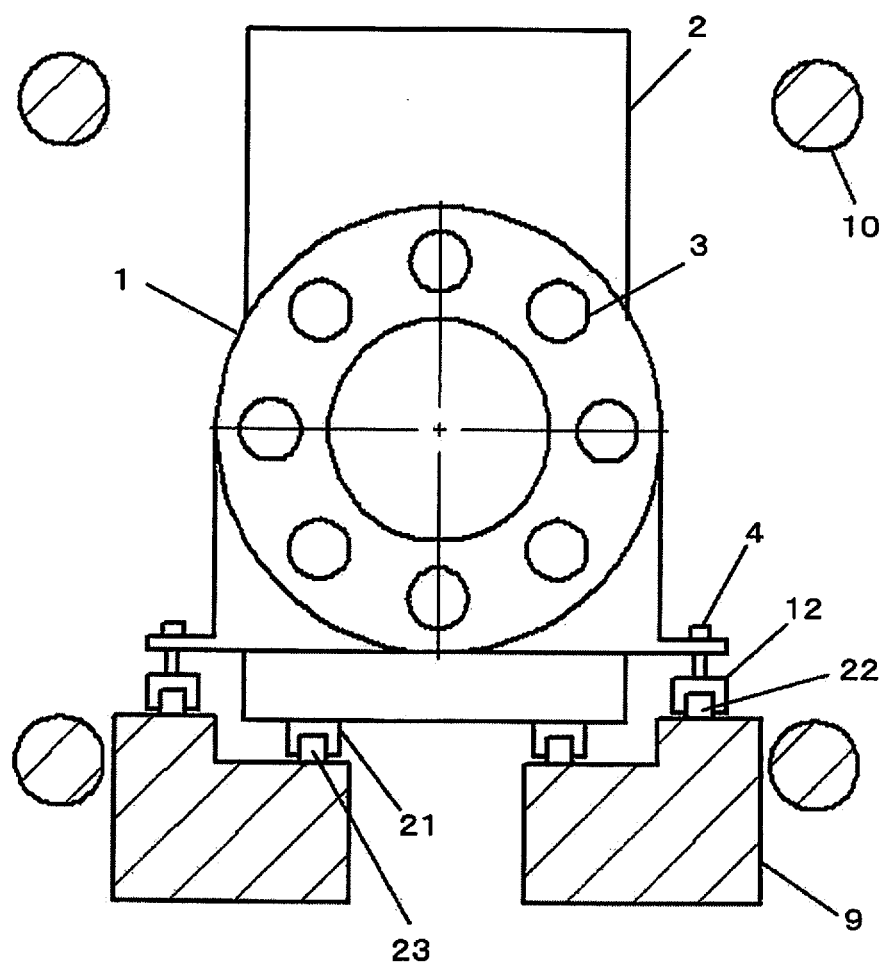
FIG. 5 is a view illustrating a method for adjusting the axis of a screw in the injection unit of FIG. 4.

A second embodiment of the injection unit of an injection molding machine according to the present invention will now be described with reference to FIGS. 4 and 5.

The present embodiment resembles the first embodiment in that a first pusher plate 1 is supported by a linear guide 12 (hereinafter referred to as first linear guide) and a position adjustment mechanism 4. However, the present embodiment differs from the first embodiment in that a second pusher plate 2 is supported by a linear guide 21 (hereinafter referred to as second linear guide) in addition to tie bars 10.

The second linear guide 21, which is separate from the first linear guide 12, is slidably provided on a guide rail 23 secured on a base 9. While the first and second linear guides 12 and 21 are located at different height positions on the base 9 in the example of FIG. 4, they may alternatively be located at the same height position on the base 9.

The first pusher plate 1, like that of the first embodiment, is secured with the aid of the position adjustment mechanism 4 on the first linear guide 12 on the base 9. Connecting bolts 3 that connect the first and second pusher plates 1 and 2 are loosened to disconnect the pusher plates 1 and 2 from each other. The position (height) of a screw 5 is adjusted by adjusting the position of the first pusher plate 1 in this state.

Further, a position adjustment mechanism (second position adjustment mechanism) may also be incorporated in the second pusher plate 2 that is supported by the tie bars 10 and the second linear guide 21. This second position adjustment mechanism may be constructed in the same manner as the position adjustment mechanism 4 on the first linear guide 12. Specifically, the second position adjustment mechanism may include a bolt capable of lifting the second pusher plate 2 and a shim inserted into a gap between the second linear guide 21 and the second pusher plate 2 lifted by the bolt. Alternatively, gaps may be previously provided between a front plate 7 and/or a rear plate 8 and the tie bars 10 so that the positions of the tie bars 10 can be adjusted when the tie bars 10 are secured to the front plate 7 and/or the rear plate 8. In this way, the position of the second pusher plate 2, which advances and retreats, guided by the tie bars 10, can be adjusted.

In the first and second embodiments described above, the first and second pusher plates 1 and 2 are supported by the linear guide 12 and the tie bars 10 (or the tie bars 10 and the linear guide 21), respectively. Alternatively, however, the first pusher plate 1 may be supported by the tie bars 10 (or the tie bars 10 and a linear guide) with the aid of bushes, and the second pusher plate 2 may be supported by the linear guide.

Figure 6:
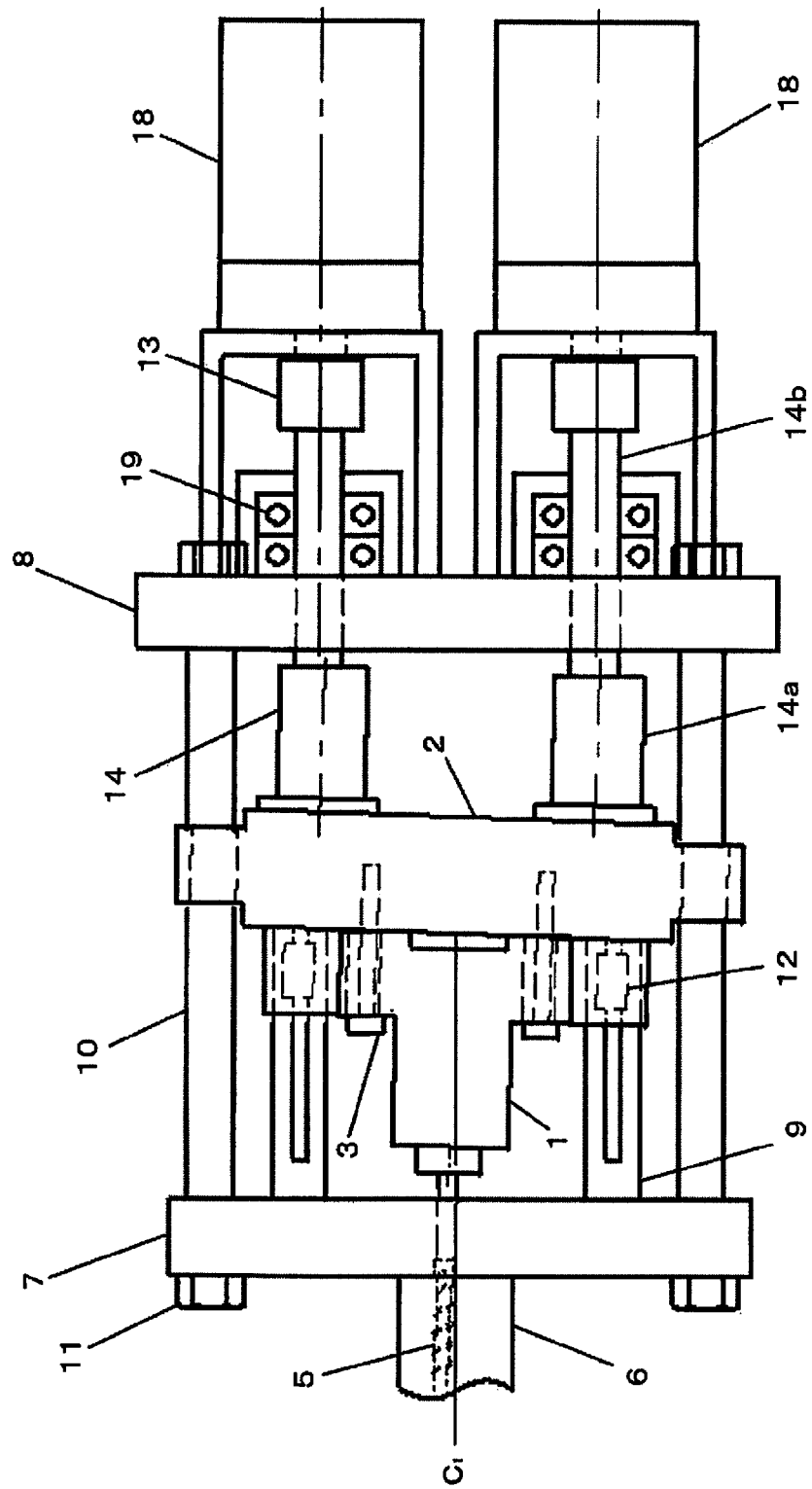
FIG. 6 is a top view illustrating a third embodiment the injection unit of an injection molding machine according to the present invention.

A third embodiment of the injection unit of an injection molding machine according to the present invention will now be described with reference to FIG. 6.

In the first and second embodiments described above, the single screw advancing and retracting motor 18 is used as drive means for the advance and retreat of the screw 5. In this embodiment, however, a plurality of screw advancing and retracting motors 18 may be used as the drive means, as shown in FIG. 6. In this case, the pusher plates are tilted due to variation of the accuracy of the ball screw 14 or a synchronization error during operation, so that the possibility of an unbalanced load being applied to the ball screw 14 increases. Thus, the configuration of the present embodiment is particularly useful in the case where a plurality of drive means are used as in this modification, and the influence of the unbalanced load on the ball screw in an initial state of assembly can be reduced.

The invention claimed is:

1. An injection unit of an injection molding machine which moves an injection screw in a longitudinal direction, the injection unit comprising:
 a first member which is disposed to be movable in the longitudinal direction and to which the injection screw is attached;
 a second member capable of being connected to the first member at the back thereof by a connection member; and
 drive means attached to the second member and capable of causing the second member to move the first member in the longitudinal direction,
 wherein the connection between the first and second members by the connection member is removable, and the first and second members are supported by different support members when the connection between the first and second members by the connection member is removed.

2. The injection unit of an injection molding machine according to claim 1, wherein the support member supporting the first member is provided with a position adjustment mechanism.

3. The injection unit of an injection molding machine according to claim 1, wherein the different support members supporting the first and second members are each provided with a position adjustment mechanism.

4. The injection unit of an injection molding machine according to claim 1, wherein the support member supporting the second member comprises a tie bar connecting a front plate and a rear plate which constitute the injection unit.

\* \* \* \* \*